United States Patent
Magnezi et al.

(10) Patent No.: US 11,182,133 B2
(45) Date of Patent: Nov. 23, 2021

(54) CONVERSION OF IMAGES INTO CI/CD JOBS

(71) Applicant: RED HAT, INC., Raleigh, NC (US)

(72) Inventors: Nir Magnezi, Ra'anana (IL); Arie Bregman, Ra'anana (IL)

(73) Assignee: RED HAT, INC., Raleigh, NC (US)

( * ) Notice: Subject to any disclaimer, the term of this patent is extended or adjusted under 35 U.S.C. 154(b) by 77 days.

(21) Appl. No.: 16/514,472

(22) Filed: Jul. 17, 2019

(65) Prior Publication Data

US 2021/0019123 A1    Jan. 21, 2021

(51) Int. Cl.
*G06F 9/44*    (2018.01)
*G06F 8/35*    (2018.01)
*G06F 11/36*    (2006.01)
*G06F 8/34*    (2018.01)

(52) U.S. Cl.
CPC .......... *G06F 8/35* (2013.01); *G06F 8/34* (2013.01); *G06F 11/3672* (2013.01)

(58) Field of Classification Search
CPC .......... G06F 8/35; G06F 8/34; G06F 11/3672
USPC .................................. 717/124–130
See application file for complete search history.

(56) References Cited

U.S. PATENT DOCUMENTS

| | | |
|---|---|---|
| 2019/0018660 A1 | 1/2019 | Bache et al. |
| 2019/0102615 A1 | 4/2019 | Mirho |
| 2020/0319859 A1* | 10/2020 | Deora ........................ G06F 8/38 |

OTHER PUBLICATIONS https://azure.microsoft.com/en-in/blog/turn-your-whiteboard-sketches-to-working-code-in-seconds-with-sketch2code/.
https://uizard.io/.
https://github.com/tonybeltramelli/pix2code.
http://ceur-ws.org/Vol-2245/hufamo_paper_4.pdf.

* cited by examiner

*Primary Examiner* — Chuck O Kendall
(74) *Attorney, Agent, or Firm* — Haynes and Boone, LLP (57) ABSTRACT

A method includes receiving a depiction with one or more elements, each element having a location within the depiction. The depiction is analyzed to identify at least one of a first type of element. The depiction is further analyzed to identify at least one of a second type of element. The location of the first and second types of elements is also identified. The method next includes creating an output comprising code to be used in a CI/CD job based on the elements in the analyzed received depiction and their location.

21 Claims, 6 Drawing Sheets

CONVERSION OF IMAGES INTO CI/CD JOBS

BACKGROUND

The present disclosure relates generally to systems capable of generating machine-readable code, and more particularly, use of image processing technology to convert images into Continuous Integration/Continuous Deployment (CI/CD) jobs.

Continuous integration and continuous deployment refer to the process by which code from one or more developers gets implemented. CI/CD utilizes workflows that may include a plurality of CI/CD jobs. A set of CI/CD jobs creates a workflow that may describe the process of integrating the work of several developers into a primary code continuously or at specified intervals of a short amount of time as to be nearly continuous. CI/CD workflows also include a process of delivering updated versions of code after integration to customers in a similar continuous or nearly continuous manner, such that customers use the most recent versions of software. The use of CI/CD allows for increased efficiency in software development because less time is spent in integration and errors in updates are minor, more easily identified, and more quickly remedied.

SUMMARY

A method includes receiving a depiction with one or more elements, each element having a location within the depiction. The depiction is analyzed to identify at least one of a first type of element. The depiction is further analyzed to identify at least one of a second type of element. The location of the first and second types of elements is also identified. The method next includes creating an output comprising code to be used as a CI/CD job based on the elements in the analyzed received depiction and their location.

A method including associating one or more elements within an image with specific functions within the CI/CD job to be created, receiving an image, analyzing the received image to identify the one or more elements, and creating the CI/CD job based on the elements within the received and analyzed image.

A system configured to associate one or more elements within an image with specific functions within the CI/CD job to be created, receive an image, analyze the received image to identify the one or more elements, and create the CI/CD job based on the elements within the received and analyzed image.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

When several software developers work separately on the same application or code, the original code is cloned before each change is made. When the change is complete, it must be implemented into the original code. This process is called integration. If the period of time between cloning the original code and integrating the edited clone is too long, or if many changes are made to the clone, integrating the clone and the original code so that all variables, functions, and elements agree can be extremely time consuming. When multiple developers separately make multiple changes to the same code at the same time, integration is even more time consuming. At times, integration can take much longer than making the necessary changes. To mitigate the problem of integration, continuous integration, more commonly known as "CI," is used. CI refers to reducing the amount of time between cloning an original code to make changes and integration. Developers practicing CI merge or integrate their changes back into the original code as often as possible. To make rapid integration possible, a workflow is generally implemented that validates developers' changes by creating a build and running automated tests against the build. One goal of a CI workflow may be to run testing automation to ensure that the original code will still function correctly after integrating a developer's change. CI is well known to those skilled in the art and those skilled in the art will appreciate that this description is not all encompassing but merely illustrative and many different examples of CI are practiced and commonly known.

There is often an additional period of time between integration of new changes and distributing the updated code or application to customers. Continuous delivery, or "CD," refers to reducing this period of time such that customers receive updated versions of applications on a very frequent basis. A CD workflow may be configured to release new versions of software manually, at prespecified times after an integration takes place, directly following an integration, or at other recurring times. Updated code may be delivered to customers as frequently as multiple times a day, daily, weekly, or according to any other schedule. Continuous delivery is also a method well known to those of ordinary skill in the art that ensures that any problems with newly released code are minor, quickly identifiable, and easily remedied.

When both continuous integration and continuous delivery are used simultaneously, the combined workflow is often referred to as a "CI/CD workflow." CI/CD jobs are employed within a CI/CD workflow. They are often configured to operate autonomously to allow developers to devote their efforts to making substantive changes to application code rather than to integration or delivery. However, automated CI/CD jobs can be complex and difficult to implement. CI/CD jobs can also be difficult to modify quickly or efficiently leading to general inefficiency throughout a system's workflow. In many applications, CI/CD jobs are first sketched in diagram form on a whiteboard, computer, tablet, paper, or any other suitable medium.

According to principles described herein, a digital image of a sketched diagram can be analyzed to recognize specific shapes and texts in accordance with a predefined convention. The digital image may be created in a variety of ways. For example, developers may draw a diagram on a whiteboard and take a picture with an image capture device such as a camera. The diagram may define various stages of a CI/CD job as well as parameters for those jobs based on a predefined convention. One example of such a convention may be for various stages (e.g., clone, install, test) to be defined in elliptical or circular shapes. Parameters for each of those stages may be defined in rectangular boxes placed adjacent to the elliptical element to which they belong. The convention may include other aspects as will be described in further detail below. Using principles described herein, developers may be able to quickly and efficiently convert their workflow diagrams to actual workflow jobs without having to write any code.

Figure 1:
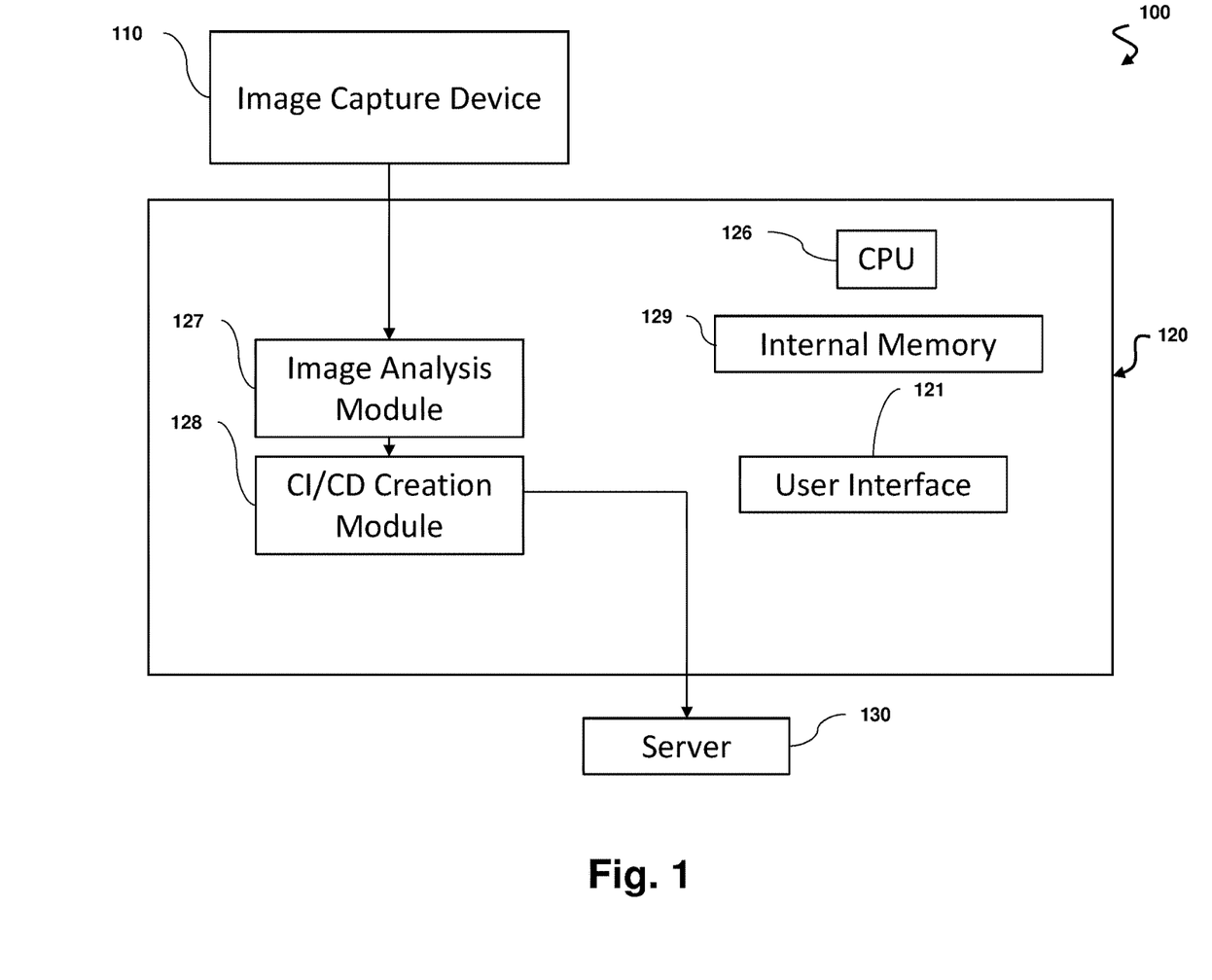
FIG. 1 is a diagram showing an illustrative computing system that may be used to generate CI/CD jobs from an image, according to one example of principles described herein.

FIG. 1 is a diagram illustrating an example system 100 that may be used to generate a CI/CD job based on an image. According to the present example, the system 100 includes an image capture device 110 and a computing system 120. The image capture device 110 may be used to create an image of a workflow diagram. The image to be captured may generally reflect a diagram, drawing, or other image that represents the CI/CD job to be created. The image capture device 110 may create the image via any number of appropriate methods. In one example, the image capture device may be a photograph camera, a video camera, a cellphone, a tablet, or any present or future developed device used for creating images. In some examples, the image capture device 110 may provide the user with the tools for creating an image digitally rather than taking a picture of a physical drawing or diagram. The image could be created by the computer system 120 either upon direction from a user. The image could further be created by scanning a document to convert the depiction on the document into an image. Any suitable form of creating or capturing the image may be employed and is fully contemplated. Additionally, the image may be of any suitable image file including PNG, JPG, JPEG, PDF, GIF, TIFF, PSD, EPS, AI, INDD, or RAW files. Other file formats are also contemplated.

The image created by the image capture device 110 may be delivered to the computer system 120 via direct connection, wireless communication, or any other suitable means. In some examples, the computer system 120 contains a processor or CPU 126. The CPU 126 may be in communication with internal memory 129 within the computer system 120. Internal memory 129 may include volatile memory such as random access memory (RAM). The random access memory (RAM) may be static random access memory (SRAM) or dynamic random access memory (DRAM) or may include any future developed form of internal memory. The internal memory 129 may further include non-volatile memory, such as read only memory (ROM). The read only memory (ROM) may include programmable read only memory (PROM), erasable programmable read only memory (EPROM), electrically erasable programmable read only memory (EEPROM), flash memory, or a combination of any of these. The read only memory (ROM) may be of a solid-state type or a hard disk drive as well as any other suitable method for storing computer files.

The computer system 120 may also utilize an image analysis module 127. The machine-readable instructions associated with the image analysis module 127 may be stored in internal memory 129. The image analysis module 127 may further be stored in the read only memory (ROM) of any particular type within the computer system 120. The image analysis module 120 may use various techniques to identify the shapes within an image as well as identify any text within those shapes. The element identified by the image analysis module 127 may then be provided to the CI/CD creation module 128.

In some examples, the CI/CD creation element 128 is also stored in internal memory 129 within computer system 120. The CI/CD creation element may be an application that interprets the elements analyzed by the image analysis program 127 and automatically creates a CI/CD job. As will be explained in more detail below, the elements of the image which are analyzed by image analysis program 127 may include different shapes, including circles, ovals, squares, rectangles, triangles, polygons of any sort, and other shapes. Each shape corresponds to a specific variable, parameter, command, or function within the CI/CD job. Other features of the image may be interpreted to produce any number of other variables, parameters, commands, or functions within the code as well.

In some examples, after the CI/CD job is generated by CI/CD creation element 128, the CI/CD job file is stored in the computer system's 120 internal memory 129. In still other examples, the CI/CD job may be displayed by any suitable means to a user through a user interface 121. The display may consist of the plain text relating to the CI/CD job created, an illustrated depiction of the steps of the job, or any other suitable method of displaying or summarizing a block of code or CI/CD job. This may be transmitted and displayed to the user directly, wirelessly, or by any other suitable means. In still other examples, the CI/CD job file may be stored in a server 130 separate from computer system 120. Again, the code may be transmitted from the computer system 120 to server 130 by any of the previously mentioned suitable means. It will be appreciated by those of ordinary skill in the art that the computer system 120 is merely illustrative and many different variations of the computer system 120 may be possible that exclude any of the named elements or include other elements not specifically named herein.

Figure 2:
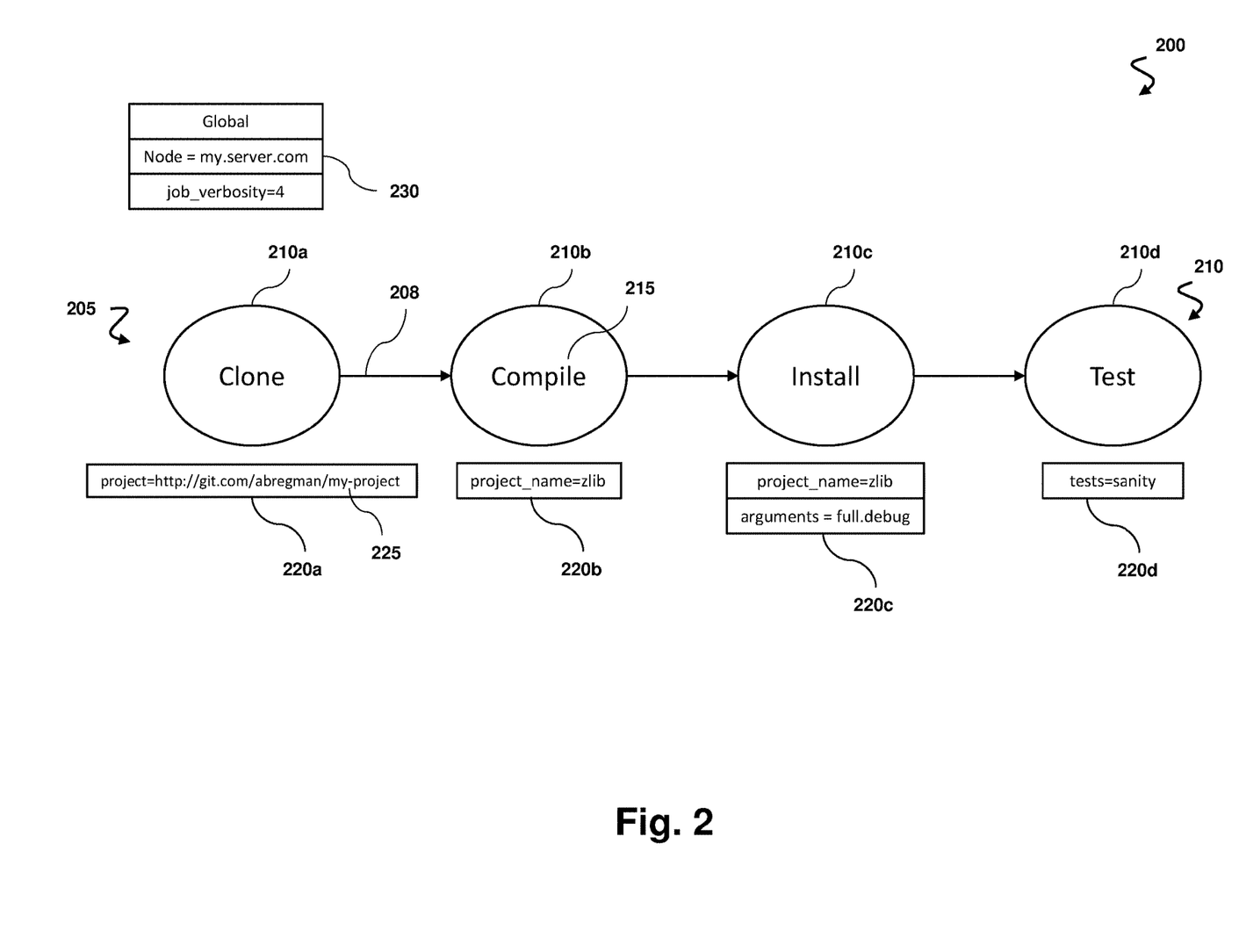
FIG. 2 is a diagram showing an illustrative image that may be used to generate a CI/CD job, according to one example of principles described herein.

FIG. 2 is a diagram showing an illustrative image 200 that may be captured with the image capture device 110 and analyzed by the computer system 120. Alternatively, image 200 may also be created by computer system 120 or any other similar system capable of creating images and transferred to computer system 120 by any suitable means. In some examples, a CI/CD job may be a collection of stages. Stages may be represented by stage elements 210 within the image. Image 200 is a depiction of four such stages positioned horizontally along a line next to one another. Image 200 may include a depiction of any number stage elements 210. For example, there may be 10, 20, or hundreds of stage elements 210 within an image 200. Alternatively, there may be as few as only one. Stage elements 210 also may not be positioned only horizontally, but may be positioned in any particular direction or of any alignment, including vertically, along a curved or angled path, or along any particular shape. However, some conventions may specify meaning to horizontal versus vertical alignment of stage elements 210 representing stages.

In some examples, stage elements 210 are placed in a particular order to form a sequence 205. The order of stages 210 may either directly or indirectly determine the order of functions or commands to be performed by the CI/CD job to be created. In this example, a stage element 210 in the CI/CD job image 200 is indicated by an ellipse with text 215 within the ellipse. It is understood that any shape may be used. Stage elements 210 may be differentiated from other elements in image 200 by being a shape that is unique within the convention. While the present example illustrates the stage elements as elliptical shapes, other shapes such as rectangles, squares, polygon of any number of sides, or arrows may be used. In addition, colors or patterns may be used to differentiate a stage element 210 from the other elements within an image 200. A stage element 210 may also be distinguished with a simple heading or title above, below, or generally near the stage element 210 with the words "Stage," "Step," or other similar words or phrases.

A stage within a CI/CD job may involve build parameters in order to run as desired. Build parameters may be represented in the image 200 by build parameter elements 220. In the example shown in FIG. 2, these build parameter elements 220 are defined by rectangles positioned directly below each stage element 210. The build parameter elements 220 may be positioned directly above, to the right or left of, or in any direction relative to their corresponding stage elements 210. Build parameter elements 220 may also be distinguished with a simple heading or title above, below, or generally near the build parameters 220 with the words "Build Parameters" or similar words or phrases. The text 225 within the rectangle may indicate the function of a particular parameter 220 and how it applies to the corresponding stage 210. For example, if a stage is a function to clone a particular project, the text 225 of the build parameter element 220 may specify which project is to be cloned and give its file location as shown in FIG. 2. In other examples, the build parameter element 220 may designate a title for a project, specify periods of time, specify file destinations for output files, among many other functions.

Additionally, an arrow 208 may be positioned between stages 210 to help indicate the order in which stages are to be completed. It is noted, however, that other mechanisms may be used to indicate the order in which stages are to be completed. The position of stage elements 210 may be used alone to indicate the order of the stages within a CI/CD job.

The image 200 may include a global parameter element 230. In the present example, the global parameter element is a rectangle that is not positioned directly beneath a stage element 210, but is located elsewhere in the image. The global parameter element 230 may define parameters that apply to all stages of the CI/CD job. The location shown in the upper left corner of the image 200 is illustrative and may be positioned anywhere within the image 200. In addition, global parameters 230 may be shown by different shapes, colors, patterns, or any other means of differentiation. Global parameters 230 may also be distinguished with a simple heading or title above, below, or generally near the global parameters 230 with the words "Global Parameters" or similar words or phrases. Global parameters 230 may define variables that apply to all stages 210, continuously monitor the status of particular variables or parameters, contain various loop functions, or perform any other suitable function.

FIG. 2 illustrates a very basic CI/CD job. In some examples, CI/CD jobs created using the present invention may be much more complex. However, for the purposes of explaining the principles relevant to the present invention, only four stages are shown in image 200. Persons of ordinary skill in the art will appreciate that many additional stages, types of stages, build parameters, and global parameters may be used to achieve various tasks throughout a workflow.

A typical CI/CD job as shown in FIG. 2 might include a first stage element 210a containing text "Clone." This function may include receiving from a server a clone or copy of a repository of a particular project. The server may be substantially similar to the server 130 of FIG. 1. This clone function may be executed each time a developer makes a change to one repository. Build parameter elements 220a that may be associated with a clone stage 210a might include designating the destination for the clone file in the internal memory 129, instructing to clone multiple projects or repositories at once or separately, designating the order in which projects or repositories should be cloned, and many others.

The stage associated with stage 210b may comprise compiling or building the changes made by a developer. Build parameter element 220b may define build parameters associated with the compile stage 210b, which may include specifying a new name for the project to be compiled, selecting which project or repository is to be compiled if multiple were cloned, and others.

The stage associated with stage 210c may comprise installing the change made. Build parameter element 220c, which defines parameters associated with stage element 210c, may include specifying when an install is to take place, notifying a user when an install is initiated or completed, the name of a particular installer to be used, the destination of the install, whether certain features will be enabled or disabled, and several others.

Finally, the stage associated with stage 210d may comprise running tests on the changes made by developers to ensure that the repository functions as intended. This test stage may include only one test, several tests, different levels of tests or tests of different branches of the application, or any type of test that may be required or beneficial to ensure accuracy of the repository and efficiency of the CI/CD workflow. Build parameters 220d may also specify whether tests are to be run simultaneously or sequentially or specify the order in which tests are to be run. They may further specify the length of time tests should take, the progress of a particular test, displaying to a user the progress of a test and its success or failure upon completion, and perform other functions.

In some examples, the text 215 of a stage element 210 indicates what function the stage 210 is to initiate. The CI/CD creation module 128 may use a set of several words or phrases with similar meaning or that may be commonly used to refer to the same function, idea, or element. In some examples, the list may be input into the system manually by a user, or the list may be created and/or updated by the computer system 120 through machine learning, or by using any other suitable means to create a more expansive list of appropriate words or phrases. If a stage 210 of an image 200 contains text 215 that is part of this list, the CI/CD creation element 128 will assign the stage 210 to the function to which all words or phrases in the list are also assigned. For example, stage 210*a* of FIG. 2 indicates a function to clone a project. Words that may be included in the list associated with cloning a project may include "clone," "replicate," "duplicate," "copy," and many others. Any one of these words placed within or around the shape of stage 210*a* would initiate a clone function. Similar lists would apply to each stage 210 in sequence 205, including a separate list corresponding to "compile", a list corresponding to "install", and a list corresponding to "test", as well as lists for any other function of a stage that may be contained within a sequence.

In some examples, after a CI/CD job is created, the computer system 120 may notify a user through user interface 121 or through any other suitable means that the job is created. In addition, the computer system 120 may be configured to notify the user of any potential problems encountered during the creation process. In some examples, computer system 120 may be further configured to recommend possible ways to remedy problems encountered. These recommendations may be prespecified by a user or identified and recommended to a user based on AI or machine learning as will be apparent to those of ordinary skill in the art. In some examples, the user may be notified after any or every stage 210 is completed. The notification may indicate the success or failure of that stage 210 as well as whether or not any following stage was initiated. The notification may further include whether recommendations of potential reasons for failure as well as remedies that may be implemented. This notification may be transmitted to the user via a user interface. The user interface may be substantially similar to user interface 121 of FIG. 1. The notification may be transmitted to the user via direct communication, wireless communication, or through any other viable means. This notification may be displayed before any given stage 210, after any given stage 210 or during any given stage 210. The notification may further indicate the progress of completion of any particular stage.

Additional more complex CI/CD jobs may include additional stages. These stages may include not only compiling the changes made by developers and running tests to ensure accuracy, but also installing the finished project after a test is successfully completed. A separate stage may be used to direct the system to save a file to a local system or to a server. The server may be substantially similar to server 130 of FIG. 1. Stages may also include analytics that may be executed once, several times, or throughout a particular job. Analytics may be included in global parameters. Analytics may be used to monitor or inspect application performance or other metrics to evaluate efficiency, accuracy, or other measurable variables. It should be readily apparent that any function or parameter that an application supports that may be incorporated into a workflow can be depicted in an image in a prespecified way and then used by the present invention to automatically build and implement that same function or parameter.

As previously mentioned, CI/CD jobs created using the presently disclosed invention may apply to building software but can also apply to any other type of workflow. For example, the presently disclosed invention may be used to create a workflow based on a drawing or image configured to automatically clean servers on a daily basis. The invention may also be used to create a workflow to sync different branches. For example, an image could be received by the system with a depiction outlining a workflow configured to sync a development branch or any other branch with a master branch. The invention may also be used to create templates of commonly created CI/CD jobs or other workflows to quickly start a workflow design project. After creation, details can then be added to the created template to accomplish more specific tasks. Several other applications of this method and system of creating CI/CD jobs are fully contemplated and will be readily appreciated by those of ordinary skill in the art.

Figure 3:
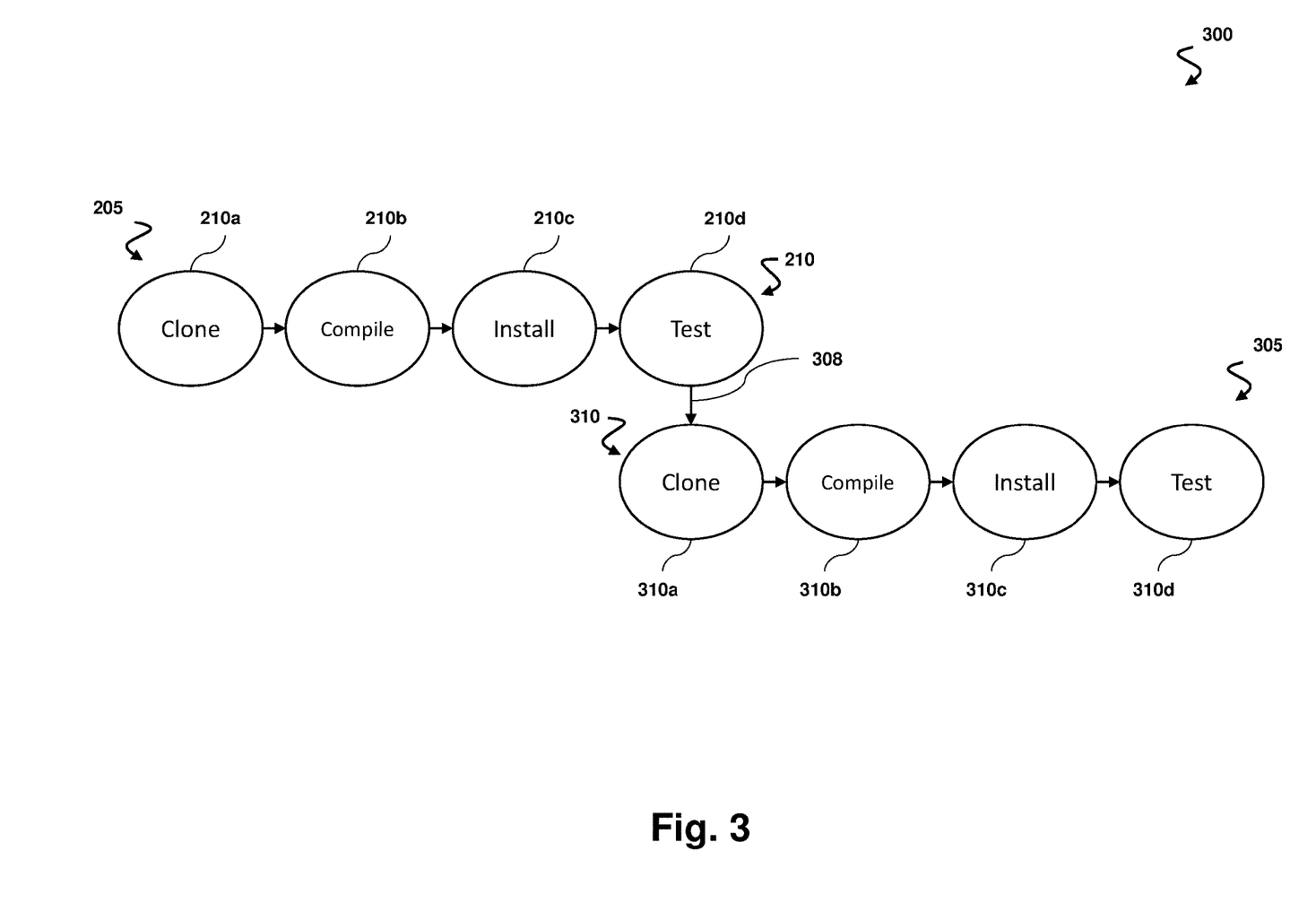
FIG. 3 is a diagram showing an illustrative CI/CD workflow that spawns another workflow in sequence, according to one example of principles described herein.

FIG. 3 is a diagram showing an example of an image 300 that may be captured with the image capture device 110 and analyzed by the computer system 120 which specifies first and second sequences 205 and 305 comprised of stages 210, the fourth stage 210*d* within first sequence 205 triggering the first stage 310*a* of the second sequence 305. In some examples, sequence 205 (which is positioned along a first horizontal line) may define a first CI/CD job while sequence 305 (which is positioned along a second horizontal line) defines a second CI/CD job. Thus, the first and second CI/CD jobs may be in series. Image 300 may be substantially similar to image 200. Similarly, image 300 may contain any number of stages 210 or 310. In some examples, multiple sequences of stages 210 may be included in the image 300. In FIG. 3, two such sequences are shown. However, any number of sequences may be included in image 300 including one, two, three, ten, or hundreds. In the example shown in FIG. 3, the fourth stage 210*d* of sequence 205 triggers the first stage 310*a* of a second sequence 305. An arrow 308 is generally used to indicate that one stage 210 of one sequence triggers another stage 310 of another sequence. The arrow 308 may be of a different orientation or direction than arrows 208 so as to indicate a triggering of another sequence 305 rather than simply specifying the order of stages 210 in one sequence. However, arrows 308 may be other shapes as well. Relative position of stage elements 210 and 310 and sequences 205 and 305 may suffice to indicate both order of stage elements 210 and 310 and triggering of additional sequences. In addition, lines may be used to indicate order between stages 210 within a sequence 205 or order between stage elements 310 within a sequence 305, while arrows may be used to indicate a triggering of one stage by another in a different sequence. Alternatively, arrows may be used to indicate order and lines may be used to indicate triggering. Any suitable indicator may be used to differentiate order between stages and triggering of stages, including different lines, weights of lines, patterns of lines, different shapes altogether, among other things. In the present example, sequence 305 also includes a clone stage element 310*a*, a compile stage element 310*b*, an install stage element 310*c*, and a test stage element 310*d*.

Figure 4:
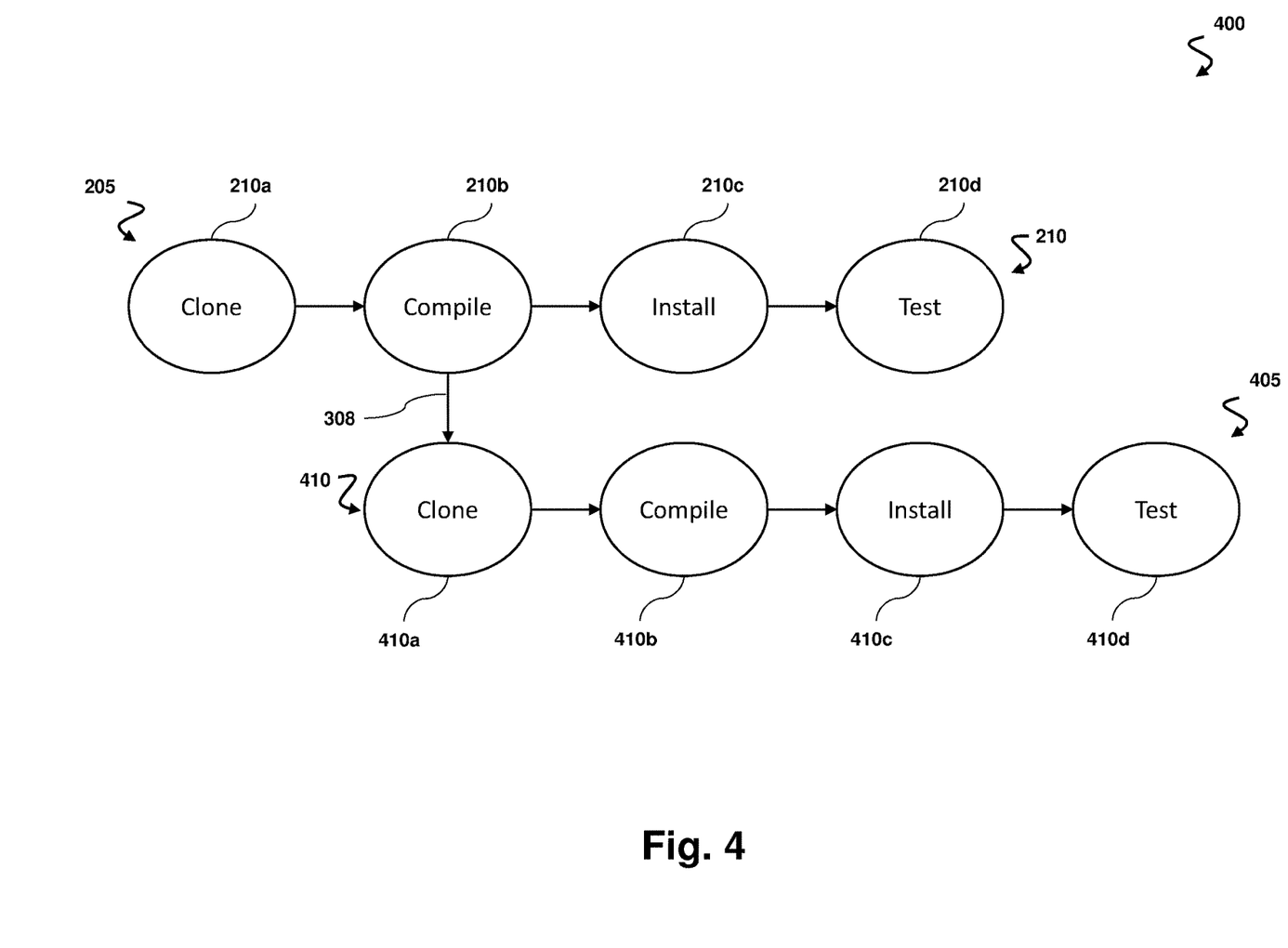
FIG. 4 is a diagram showing an illustrative CI/CD workflow that spawns another workflow in parallel, according to one example of principles described herein.

FIG. 4 is a diagram showing an example of an image 400 that may be captured with the image capture device 110 and analyzed by the computer system 120 which specifies first and second sequences 205 and 305 composed of stage elements 210 and stages 410 respectively, the second stage 210*b* of the first sequence 205 triggering the first stage 310*a* of the second sequence 305 and both sequences being executed simultaneously. In some examples, sequence 205 (which is positioned along a first horizontal line) may define a first CI/CD job while sequence 405 (which is positioned along a second horizontal line) defines a second CI/CD job. Thus, the first and second CI/CD jobs may be at least partially in parallel. Image 400 may be substantially similar to image 300 or image 200. More than two sequences may be included in image 400. More than two sequences may be configured to run simultaneously. Any number of sequences may be included in an image 400 including one, two, three, ten, or hundreds. It is also contemplated that one stage 210 of a sequence may trigger more than one sequence, such that three or more sequences may be executed simultaneously. In some examples of the invention, a sequence which triggers another sequence may be referred to as a "parent job" or "parent sequence." A sequence which is subsequently triggered by a parent job may be referred to as a "child job" or "child sequence." In the present example, sequence 405 also includes a clone stage element 410a, a compile stage element 410b, an install stage element 410c, and a test stage element 410d.

FIGS. 3 and 4 do not include build parameter elements 220 or global parameter elements 230 for simplicity's sake. It is fully contemplated that build parameter elements 220 and global parameter elements 230 may be included in images depicting multiple sequences in much the same way as they are included in images containing a single sequence.

Figure 5:
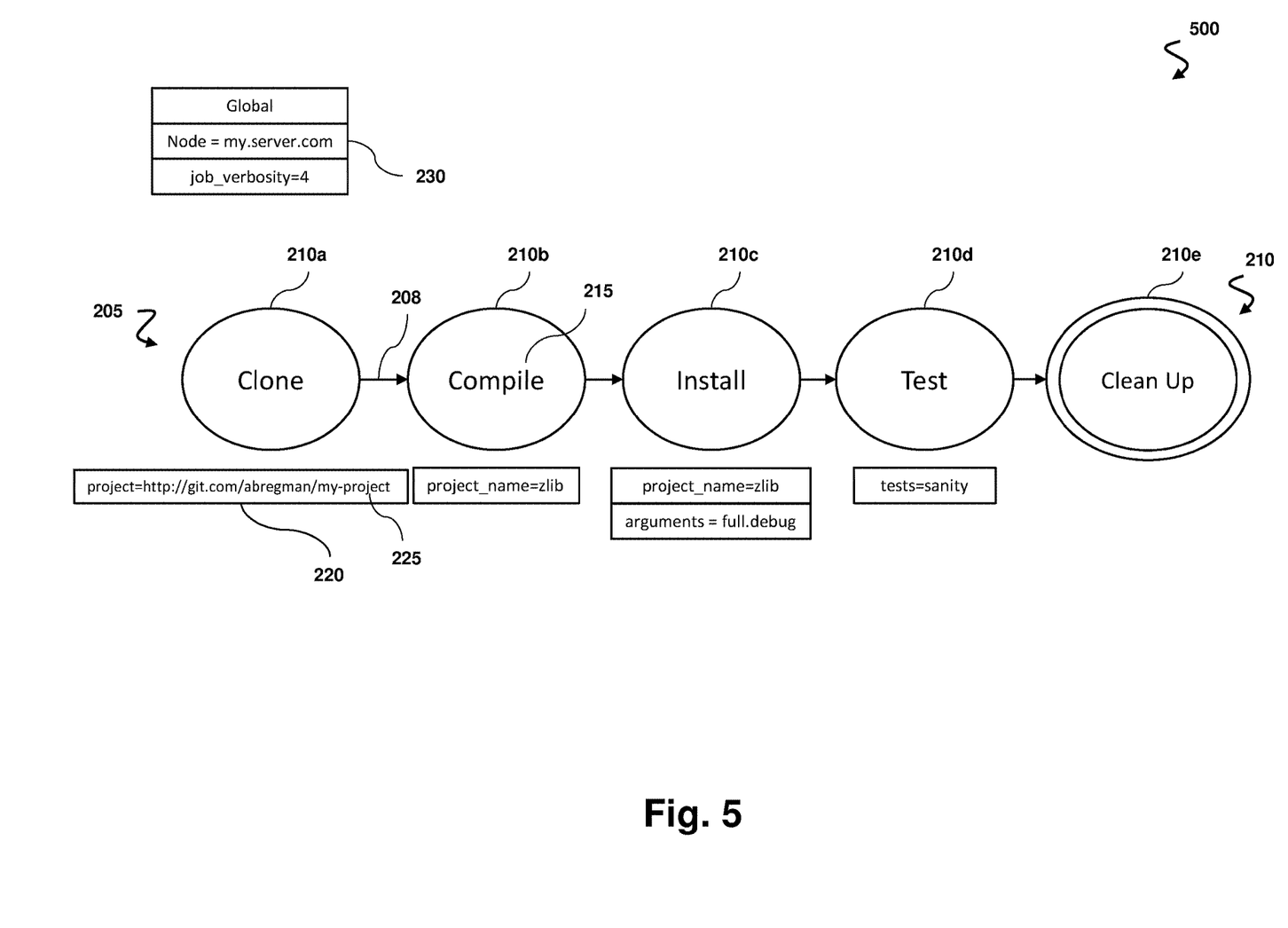
FIG. 5 is a diagram showing an illustrative CI/CD workflow that includes a job generated based on other jobs, according to one example of principles described herein.

FIG. 5 is a diagram showing an illustrative image 500 that may be captured with the image capture device 110 and analyzed by the computer system 120. Alternatively, image 500 may also be created by computer system 120 or any other similar system capable of creating images and transferred to computer system 120 by any suitable means. Image 500 may be substantially similar to image 200, image 300, or image 400. Image 500 includes five stage elements 210, 210a, 210b, 210c, 210d, and 210e. In some examples, stage elements 210 are executed in the order in which they are depicted in image 500. Specifically, stage 210b is executed after stage 210a, as indicated by arrow 208. A similar sequence may apply to the remaining stages 210c, 210d, and 210e. In some examples, a stage may be executed if the previous stages are completed. In some examples, a stage 210 may be executed if the previous stages are completed in the order in which they appear in image 500. In other examples, a stage is only executed if the previous stages are completed, but not necessarily in the order in which they appear. Arrow 208 may be used to indicate this conditional relationship between stages 210 within sequence 205. Alternatively, different types of lines, patterned lines, or shapes may be used to identify whether a stage 210 is to be executed depending on the success of previous stages 210, whether the order in which previous stages 210 were completed is conditional, or to denote other conditional relationships between stages 210.

In some examples, a stage 210e is included. In FIG. 5, stage element 210e is positioned to the right of all other stages 210. In some examples, stage 210e may be positioned to the left or before all other stage elements 210, or positioned somewhere between other stage elements 210. In still other examples, stage element 210e may be positioned anywhere within image 500. In this illustrative example, stage 210e is differentiated from other stages 210 via two concentric circular shapes, rather than only one circular shape. Stage 210e may be differentiated in any particular way such that it's appearance is somehow different from the other stages 210. For example, different colors, patterns, shapes, concentric shapes, headings, or any other indicator may be used to differentiate stage 210e. Stage element 210e differs from other stage elements 210 in that stage element 210e defines a stage that is configured to be executed regardless of the success or failure of any of the other stages within a CI/CD job. As an illustrative example, text 215 within stage element 210e refers to a clean-up function that is often preferred to be completed regardless of whether or not the previous or later stages 210 are successfully completed. Although not depicted in image 500, build parameters 220 may be assigned to stage 210e just like any other stage 210.

The CI/CD job illustrated in the attached figures and throughout the foregoing paragraphs may be triggered in several ways. The job may be triggered manually by a user through the user interface 121 of computer system 120. This may be done at the location of the computer system 120 or at any remote location away from computer system 120. The job may be triggered using either the same computer system 120 or using a different computer system in either direct or wireless communication with computer system 120. Alternatively, the CI/CD job may be triggered at a particular predetermined time. This time may be recurring such that the job is triggered automatically once a day, multiple times a day, once a week, multiple times a week, or according to any other suitable schedule, or a user may specify one time at which the CI/CD job will be triggered that is not recurring. The CI/CD job may also be triggered by a particular event. Events may include when a developer implements a change, clones a project, or any other suitable task or occurrence.

Figure 6:
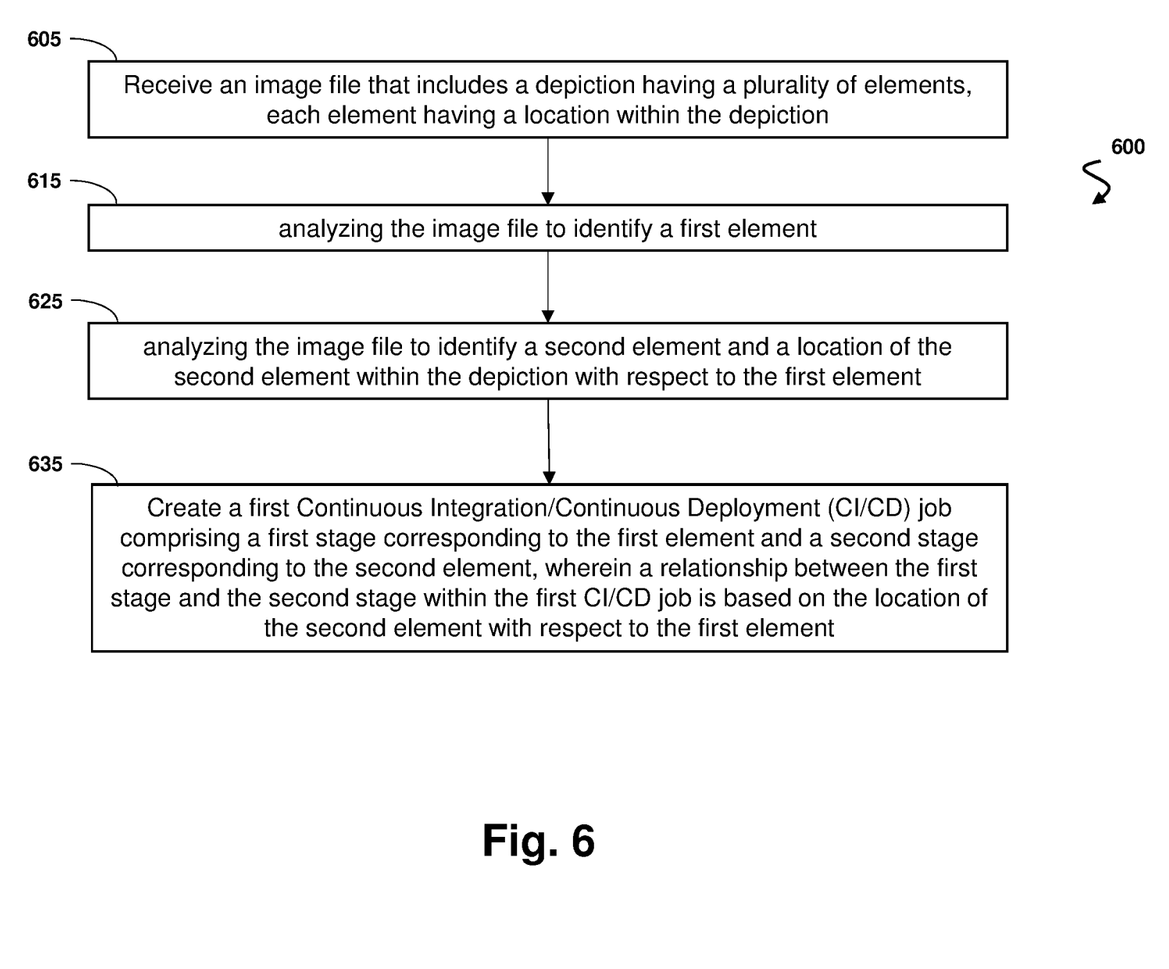
FIG. 6 is a flowchart showing an illustrative example of a method for producing a CI/CD job code based on a received image, according to one example of principles described herein.

FIG. 6 is a flowchart 600 showing an illustrative example of a method for producing a CI/CD job based on a received image or depiction. According to the present example, the method 00 includes a process 605 for receiving an image file that includes a depiction having a plurality of elements, each element having a location within the depiction. The elements may be, for example, stage elements (e.g., 210, FIG. 2).

The method 600 further includes a process 615 for analyzing the image file to identify a first element. For example, analysis of the image may determine that the first element is an elliptical shape and thus indicates a stage within a CI/CD job. Additionally, the analysis may identify text within the first element indicating the type of stage (e.g., clone, install, test).

The method 600 further includes a process 625 for analyzing the image file to identify a second element and a location of the second element within the depiction with respect to the first element. For example, the analysis may indicate a second stage based on the shape of the second element. Further, the analysis may indicate that the stage associated with the second element is to be performed after the stage associated with the first element because the second element is positioned to the right of the first element.

The method 600 further includes a stage 635 for creating a first Continuous Integration/Continuous Deployment (CI/CD) job comprising a first stage corresponding to the first element and a second stage corresponding to the second element. A relationship between the first stage and the second stage within the first CI/CD job is based on the location of the second element with respect to the first element.

The benefits of the present invention will be readily apparent to those of ordinary skill in the art. The ability for a computer system 120 to produce a functioning CI/CD job automatically without assistance or direction from a user may dramatically increase efficiency in systems that implement a CI/CD workflow. The present system may also be applied to several other applications that utilize a workflow. The present invention allows a CI/CD job to be created almost instantaneously. As soon as a new CI/CD is conceived, discussed, and illustrated in some manner, it can be implemented immediately. This innovation drastically decreases development time of any type of workflow.

Although illustrative examples have been shown and described, a wide range of modification, change and substitution is contemplated in the foregoing disclosure and in some instances, some features of the examples may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the examples disclosed herein.

What is claimed is:

1. A method performed by a computing system, the method comprising:
   receiving an image file that includes a depiction having a plurality of elements, each element having a location within the depiction;
   analyzing the image file to identify a first element;
   analyzing the image file to identify a second element and a location of the second element within the depiction with respect to the first element;
   creating a first Continuous Integration/Continuous Deployment (CI/CD) job comprising a first stage corresponding to the first element and a second stage corresponding to the second element, wherein a relationship between the first stage and the second stage within the first CI/CD job is based on the location of the second element with respect to the first element.

2. The method of claim 1, further comprising, identifying a build parameter element within the depiction.

3. The method of claim 2, wherein the build parameter is distinguished from the first or second element based on a shape of the build parameter.

4. The method of claim 2, wherein the build parameter element is associated with the first element based on a position of the build parameter element with respect to the first element.

5. The method of claim 4, wherein the build parameter element defines build parameters for the first stage.

6. The method of claim 2, wherein the build parameter element is rectangular in shape.

7. The method of claim 1, wherein the first element includes text within.

8. The method of claim 1, further comprising, identifying a global parameter element within the depiction, the global parameter element defining parameters applicable globally to the first CI/CD job.

9. The method of claim 1, wherein the first element and the second element are elliptical in shape.

10. The method of claim 1, wherein the depiction includes elements associated with a second CI/CD job, elements associated with the second CI/CD job being on a different line than the first and second elements.

11. The method of claim 9, wherein based on positioning of the elements associated with the second job with respect to the first and second elements, the second CI/CD job is to be performed in series with the first CI/CD job.

12. The method of claim 9, wherein based on positioning of the elements associated with the second job with respect to the first and second elements, the second CI/CD job is to be performed in at least partially in parallel with the first CI/CD job.

13. A method performed by a computing system, the method comprising:
    receiving an image file;
    identifying a first element of a first type within the image file;
    identifying a second element of the second type within the image file; and
    creating a CI/CD job with a first stage based on the first element, the first stage having parameters defined by the second element.

14. The method of claim 12, further comprising:
    identifying a third element of the first type and a fourth element of the second type; and
    adding a second stage to the CI/CD job, the second stage being based on the third element and having parameters defined by the fourth element.

15. The method of claim 12, wherein the CI/CD job is triggered at a particular time.

16. The method of claim 12, wherein the CI/CD job is triggered manually.

17. The method of claim 12, wherein the CI/CD job is triggered after a particular event.

18. The method of claim 12, further comprising identifying a global parameter element within the image file, the global parameter element defining parameters for the CI/CD job.

19. A system comprising:
    a processor; and
    a memory comprising machine readable instructions that when executed by a processor, cause the system to:
    receive an image file that includes a depiction having a plurality of elements, each element having a location within the depiction;
    identify a first element within the depiction;
    identify a second element and a location of the second element within the depiction with respect to the first element;
    create a first Continuous Integration/Continuous Deployment (CI/CD) job comprising a first stage corresponding to the first element and a second stage corresponding to the second element, wherein a relationship between the first stage and the second stage within the first CI/CD job is based on the location of the second element with respect to the first element.

20. The system of claim 18, wherein the first element represents a first stage and the second element represents a second stage.

21. The system of claim 19, wherein the depiction includes a build parameter element positioned adjacent the first element, the build parameter element defining parameters for the first stage.

* * * * *